Sept. 16, 1941. W. H. HUNTER ET AL 2,256,431
EXPANSIBLE BRAKE STRUCTURE
Filed March 1, 1940
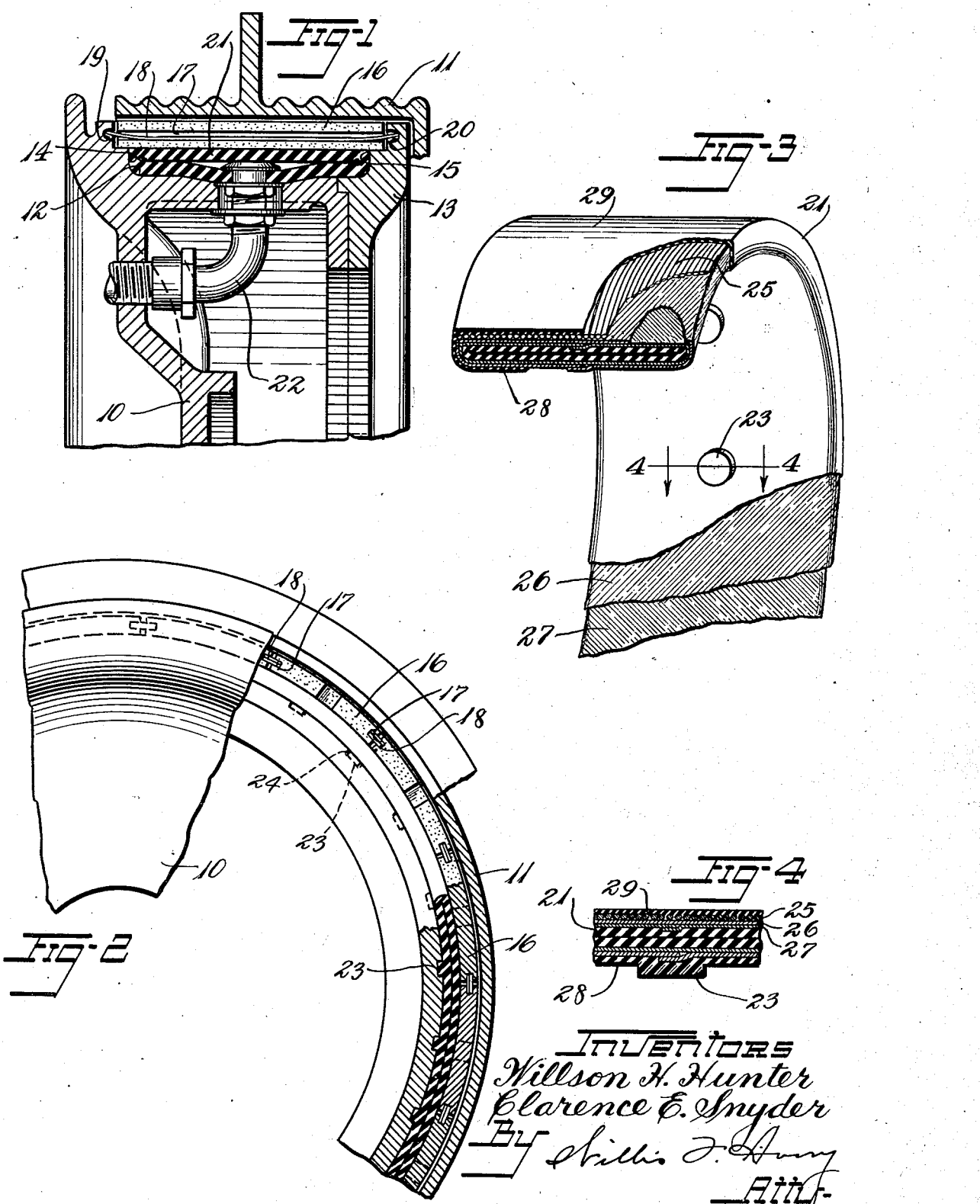

Patented Sept. 16, 1941

2,256,431

UNITED STATES PATENT OFFICE 2,256,431

EXPANSIBLE BRAKE STRUCTURE

Willson H. Hunter and Clarence E. Snyder, Akron, Ohio, assignors to The B. F. Goodrich Company, New York, N. Y., a corporation of New York Application March 1, 1940, Serial No. 321,706

4 Claims. (Cl. 188—152)

This invention relates to brakes for retarding the rotation of rotatable bodies such as the wheels of aircraft and other vehicles, and clutches, and it pertains especially to brakes operated by fluid pressure.

The principal objects of the invention are to provide for more effectively maintaining the strength of the expansible member under the stresses imposed, especially for installations where torque is transmitted through the member, to provide effective torque absorption, to avoid an objectionable localizing of stresses in the member, and to provide facility of manufacture and assembly.

These and other objects will appear from the following description and the accompanying drawing.

Of the drawing:

Fig. 1 is an axial cross-sectional view of the brake of the invention.

Fig. 2 is a side elevation thereof, partly broken away and partly in section.

Fig. 3 is a perspective view of the inflatable tube member, parts being broken away and parts shown in section to show its construction.

Fig. 4 is a detail cross-sectional view taken on line 4—4 of Fig. 3.

The invention is generally directed to that type of fluid-operated brake in which a brake element is supported by a stationary torque member for limited movement toward a rotatable torque member under the influence of an expansible member, and the invention provides an improved construction of such member suitable where the member is unattached to the brake element or elements, and especially where the expansible member is to transmit the torque.

Referring to the drawing, the numeral 10 designates a stationary torque member or torque frame which may be supported from the shaft about which the wheel revolves in any desired manner. A brake drum 11 is fixed to the wheel and surrounds a channel 12 defined by the torque frame and a removable flange 13 fixed to the torque frame by bolts or other fastening means. Annular shoulders 14, 15 formed at the sides of the channel 12 normally support a series of brake elements 16 of arcuate shape in non-braking position, the brake elements being formed with opposed grooves 17 between each pair of elements to receive leaf springs 18 for urging them radially inwardly, away from the drum. Circumferentially extending grooves 19, 20 opposed to each other and formed in the sidewalls of the channel 12 above the shoulders 14, 15 receive the ends of the springs 18 and act to retain the springs in tensioned relation to the brake elements. The springs preferably are bowed from end to end as shown so as to press the brake elements inwardly away from the brake drum. The arrangement in the illustrative embodiment is such that rotational movement of the assembly of brake elements and springs about the torque frame can occur, the expansible members being utilized to take the torque. If desired, however, the brake elements may be individually anchored to the frame against relative rotational movement in order to relieve the expansible member from taking the torque.

For applying braking pressure, an inflatable expander tube 21 is seated in the channel 12 preferably completely occupying in its unexpanded condition the space between the channel and the brake elements with its radially inner and outer walls flattened against each other in the inactive position. Means, in the form of a nipple 22 extending through the floor of the channel 12 and connecting with the interior of the tube, is provided for admitting fluid under pressure to expand the tube and for draining it when the fluid pressure is released. The tube body comprises rubber or other rubber-like material, reinforced as herein described.

For supplementing frictional resistance of the expander tube against rotation of the tube with relation to the torque frame, a series of buttons 23 may be formed integral with the expander tube on its inner face and recesses 24 for receiving the buttons may be provided in the torque frame at the floor of the channel, the arrangement being such that each button 23 fits in a recess 24 and keys the expander tube against rotative movement. The buttons may be of rubber integral with the body of the tube, or fabric or other suitable material vulcanized or otherwise secured thereto.

It is desirable to provide the outer face of the expander tube with stiffening means for compelling expansion in a substantially flat condition and limiting expansion, and for this purpose a layer 25 of circumferentially disposed cords is built into the outer wall of the expander tube. These cords not only limit expansion but also prevent uneven expansion and provide more nearly uniform distribution of pressure across the under faces of the brake elements. They also strengthen the tube against rupture at the places where it bridges any spaces between the brake elements.

In the illustrative embodiment the brake elements 18 are not secured to the torque frame nor the expander tube but are free to float around the torque frame as a group except when clamped against the brake drum by the inflation of the expander tube so that the braking force is absorbed through the expander tube. To provide greater strength in the edges of the expander tube, to provide greater strength thereof against fatigue, to eliminate sawing of tension members, especially at the margins of the tube, and to provide for taking the braking load substantially tangential of the torque member, a layer 26 of parallel cords is disposed throughout the wall of the expander tube with the cords thereof extending diagonally in one direction and a second layer 27 of similar cords is disposed adjacent thereto in the wall with its cords extending diagonally in the opposite direction at the same angle and crossing the cords of the first layer. The cords may be individual cords laid close together in parallel arrangement and held only by the rubber of the tube body in which the cords are embedded. Preferably each cord is insulated from adjacent cords by such rubber. To facilitate handling in processing, the cords may be made into a weak-wefted cord fabric, the light weft threads of which are adapted to break in service so that the cords function individually. The expression "unwoven cords" as used herein includes both the weftless and the weak-wefted cord fabrics.

The use of crossed layers of cords balances the forces acting upon the tube thereby preventing any axial movement of the tube, and the arrangement of the cords diagonally of the tube also provides the maximum number of tension members extending tangentially of the torque frame to sustain the breaking load without any interweaving of the cords, especially at the margins of the tube, such as would cause a sawing action of the cords. The layers of cord material are insulated by coatings of rubber to permit relative movement under load without friction of the cords on each other. At the interior of the expander tube, a layer 28 of impervious extensible material of a rubber-like nature such as neoprene, polymerized vinyl chloride composition, or the like, that will be unaffected by oils or other hydraulic liquids, is provided. This layer is bonded to the rubber of the body and to the cord layers which act to reinforce it against failure due to hydraulic pressure and to torque loads transmitted therethrough.

A layer 29 of wear and heat resisting composition of rubber or other rubber-like composition on the radially outer face of the expander tube acts to protect the cord layers from wear due to slippage of the brake blocks with relation to the surface of the expander tube and provides a smooth uniform surface to support the blocks. When the brake is applied the brake blocks may slip somewhat along the face of the expander tube and the resilience of the tube makes possible some yielding, thereby providing against sudden seizing of the brake.

Variations of this construction may be made without departing from the scope of the invention as it is defined by the following claims.

We claim:

1. An expansible member suitable for applying pressure to a brake element or the like in unattached relation thereto by fluid pressure within the member and for transmitting torque through the member, said member comprising an annular hollow body of a form in cross-section providing a generally flat pressure-transmitting wall and side margins, said body comprising rubber-like material having a reinforcement of crossed layers of diagonally disposed unwoven cords in the pressure transmitting wall of the body and around said margins thereof, and a layer of longitudinally disposed cord material outwardly of said diagonally disposed cords for maintaining said pressure transmitting wall substantially flat across its width during distension thereof.

2. An expansible member for applying pressure to a brake element or the like part of a frictionally engageable structure, said member comprising a hollow expansible body comprising rubber-like material and having marginal walls uniting opposed walls, one of which is a movable wall for transmitting pressure to said element, means for admitting pressure fluid to move the pressure-transmitting wall, means in said pressure-transmitting wall to limit distortion thereof for effecting movement substantially uniformly across its width, and crossed layers of unwoven cords extending diagonally across said pressure-transmitting wall adjacent the distortion-limiting means, said cords extending along the marginal walls of the member to distribute the frictional load in the member.

3. An expansible member for applying pressure to a brake element or the like part of a frictionally engageable structure, said member comprising a hollow annular expansible body comprising rubber-like material and having marginal walls uniting opposed inwardly and outwardly facing walls approximately in contact with each other in the unexpanded condition, one of said opposed walls being a movable pressure-transmitting wall, means for admitting pressure fluid to move said pressure-transmitting wall, means for limiting distortion of said pressure-transmitting wall, and crossed layers of unwoven cords extending diagonally across said pressure-transmitting wall, said cords extending along the marginal walls of the member to distribute the frictional load in the member.

4. An expansible member for applying pressure to a brake element or the like part of a frictionally engageable structure, said expansible member comprising a hollow expansible body comprising rubber-like material and having marginal walls uniting opposed walls approximately in contact with each other in the unexpanded condition, one of said opposed walls being a movable pressure-transmitting wall, means for admitting pressure fluid to move said pressure-transmitting wall, means comprising longitudinally disposed cords for limiting distortion of the pressure-transmitting wall under pressure, and crossed layers of unwoven cords extending diagonally across the pressure-transmitting wall adjacent the first said cords and along the marginal walls of the member to distribute the frictional load in the member.

WILLSON H. HUNTER.
CLARENCE E. SNYDER.